(12) United States Patent
Costabeber

(10) Patent No.: US 9,969,129 B2
(45) Date of Patent: May 15, 2018

(54) STEREOLITHOGRAPHY MACHINE WITH IMPROVED OPTICAL UNIT

(71) Applicant: Ettore Maurizio Costabeber, Zane (IT)

(72) Inventor: Ettore Maurizio Costabeber, Zane (IT)

(*) Notice: Subject to any disclaimer, the term of this patent is extended or adjusted under 35 U.S.C. 154(b) by 712 days.

(21) Appl. No.: 14/484,545

(22) Filed: Sep. 12, 2014

(65) Prior Publication Data

US 2015/0076740 A1    Mar. 19, 2015

(30) Foreign Application Priority Data

Sep. 18, 2013   (IT) ................. VI2013A0229

(51) Int. Cl.
| | |
|---|---|
| *B29C 67/00* | (2017.01) |
| *B29C 64/135* | (2017.01) |
| *B29C 64/386* | (2017.01) |
| *B29K 105/00* | (2006.01) |
| *G02B 26/08* | (2006.01) |

(52) U.S. Cl.
CPC ........ *B29C 67/0066* (2013.01); *B29C 64/135* (2017.08); *B29C 64/386* (2017.08); *B29K 2105/0058* (2013.01); *G02B 26/0833* (2013.01)

(58) Field of Classification Search
CPC ................................................. B29C 67/0066
See application file for complete search history.

(56) References Cited

U.S. PATENT DOCUMENTS 5,985,204 A    11/1999  Otsuka et al.
7,815,847 B2   10/2010  Gennaro et al.

FOREIGN PATENT DOCUMENTS

JP    2000263650    9/2000
TW       394853     6/2000
(Continued)

OTHER PUBLICATIONS

Ferreira ("Microstereolithography Using Digital Micromirror Devices", Information Technology and Electrical Engineering—Devices and Systems, Materials and Technologies for the Future, Jul. 7, 2006, XP055032918, ISBN: 978-3-93-884315-4).*

(Continued)

*Primary Examiner* — Larry Thrower
(74) *Attorney, Agent, or Firm* — Husch Blackwell LLP

(57) ABSTRACT

The invention is a stereolithography machine (1) comprising: a container (2) for a fluid substance (15); a source (3) of predefined radiation (3a) suited to solidify the fluid substance (15); an optical unit (4) suited to direct the radiation (3a) towards a reference surface (5) in the fluid substance (15); a logic control unit (6) configured so as to control the optical unit (4) and/or the source (3) so as to expose a predefined portion of the reference surface (5). The optical unit (4) comprises two micro-opto-electro-mechanical systems (MOEMS) (7, 8) arranged in series, each one of which is provided with a mirror (9) associated with actuator means (12) suited to set it rotating around a rotation axis (X1, Y1), said two micro-opto-electro-mechanical systems (MOEMS) (7, 8) being arranged in such a way as to allow the radiation (3a) to be directed towards each point of the reference surface (5) through a corresponding combination of the rotations of the respective mirrors (9) around the two axes (X1, Y1).

14 Claims, 2 Drawing Sheets

(56) References Cited

FOREIGN PATENT DOCUMENTS

TW   542921    7/2003
TW   M389021   2/2010

OTHER PUBLICATIONS

Yalcinkaya et al. ("Two-Axis Electromagnetic Microscanner for High Resolution Displays", Journal of Microelectromechanical Systems, IEEE Service Center, US, vol. 15, No. 4, Aug. 1, 2006, pp. 786-794, XP008145248, ISSN: 1057-7157, DOI: 10.1109/JMEMS.2006.879380.*
Office Action regarding Taiwan patent application No. TW20140131521, (3 pgs).
Machine translation for cited reference TWM389021 (7 pgs.).

* cited by examiner

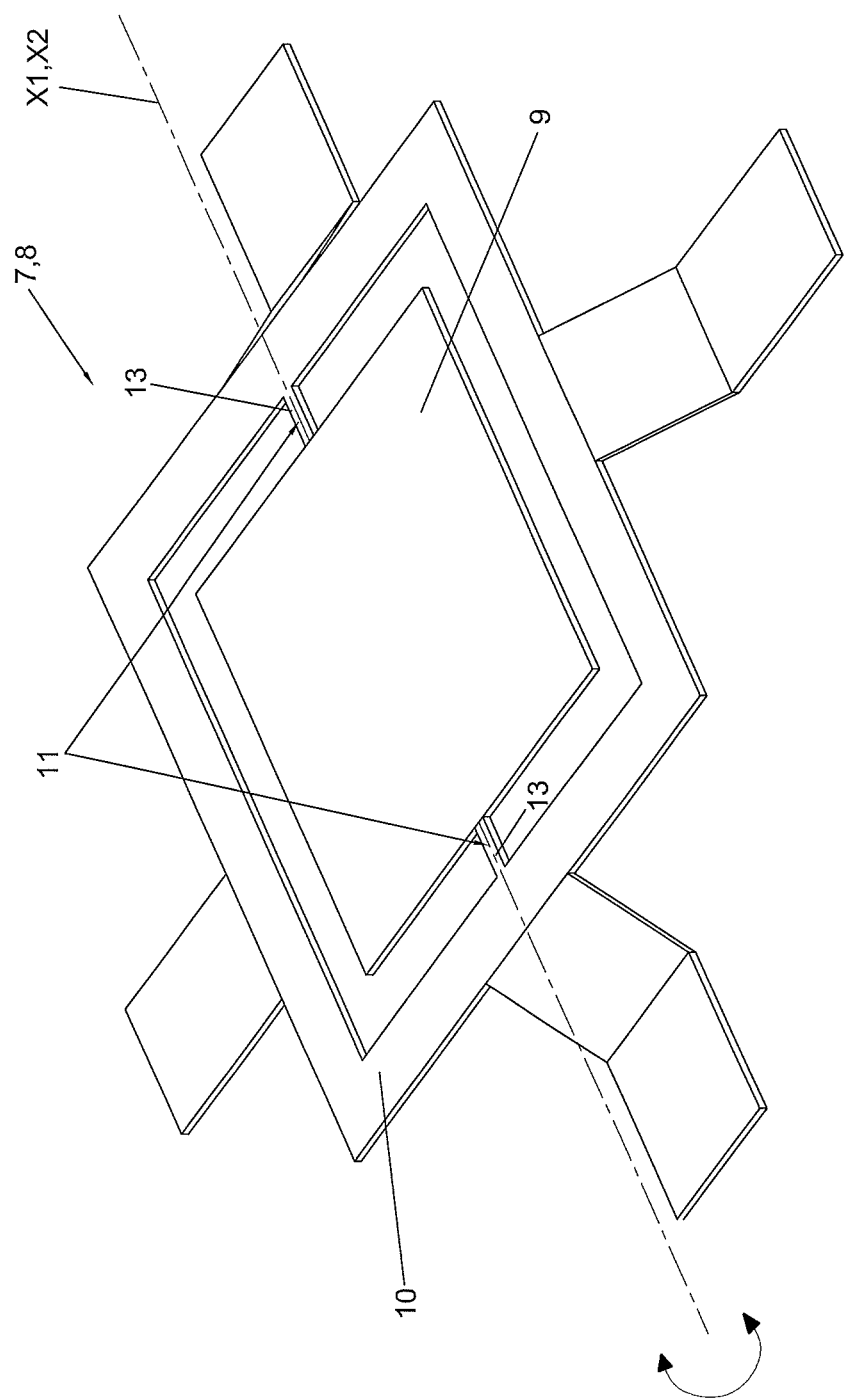

STEREOLITHOGRAPHY MACHINE WITH IMPROVED OPTICAL UNIT

The invention concerns a stereolithography machine of the type suited to make three-dimensional objects by means of a plurality of superimposed layers, in which each layer is obtained through the selective solidification of a fluid substance in the areas corresponding to the volume of the object to be produced.

A stereolithography machine of the known type comprises a container in which there is the fluid substance, generally a light-sensitive resin in the liquid or pasty state.

The machine comprises also a source that is generally of the luminous type and emits radiation suited to solidify the fluid substance.

An optical unit provides for conveying said radiation towards a reference surface arranged inside the container, which corresponds to the position of the layer of the object to be solidified.

The three-dimensional object being formed is supported by a modelling plate, which can be moved vertically with respect to the container, in such a way as to allow the last solidified layer of the object to be arranged in a position adjacent to said reference surface.

In this way, once each layer has been solidified, the modelling plate is moved in such a way as to arrange the solidified layer so that it is again adjacent to the reference surface, after which the process can be repeated for the successive layer.

The stereolithography machines of the above mentioned type are divided in two main embodiments that are described, for example, in the Italian patent application no. VI2010A000004, in the name of the same applicant who is filing the present invention.

According to the first one of said embodiments, the reference surface is arranged so that it is adjacent to the bottom of the container, which is transparent to radiation.

In this case, the fluid substance is irradiated from below and the three-dimensional object is formed under the modelling plate.

According to the second embodiment of the invention, the reference surface is arranged at the level of the free surface of the fluid substance.

In this second case, the fluid substance is irradiated from above and the three-dimensional object is formed over the modelling plate.

In both of the embodiments, the radiation can be conveyed towards the different points of the reference surface by means of different optical units of the known type.

A first type of optical unit comprises a matrix of mirrors that can be controlled individually in such a way as to project the image of the object's layer onto the predefined surface.

In particular, each mirror can assume two different positions, an active position in which the radiation is reflected towards a corresponding point of the reference surface and a passive position in which the radiation is reflected towards a dispersion area.

Said matrices of mirrors can light the entirety of the reference surface simultaneously, making it possible to obtain each layer through a single exposure and, therefore, in a particularly rapid manner.

However, the matrices of mirrors have limited definition, with the consequent drawback that objects with irregular edges are obtained.

A further limitation of said systems lies in that the image they generate has uniform light intensity on its entire surface.

Therefore, the drawback arises that said systems do not allow the light power to be modulated in the different areas of the reference surface.

In a second type of optical unit the radiation is conveyed onto a single point of the reference surface and said point is moved in such a way as to be able to progressively light the entire portion of the reference surface corresponding to the volume of the object.

Compared to the optical unit previously described, the latter offers the advantage that the light beam can be directed towards any point of the reference surface, making it follow continuous trajectories and thus obtaining objects that do not present the irregularities caused by the optical units of the type described above.

Furthermore, this type of optical units advantageously makes it possible to modify the light intensity in the different areas of the reference surface.

A known embodiment of the optical unit of the second type described above includes a laser source that is moved on two orthogonal axes by means of a mechanical device.

This embodiment poses the drawbacks that the movement of the light beam is rather slow and that, furthermore, the mechanical moving device can be subject to failures and therefore requires a certain amount of maintenance.

In a different embodiment of the optical unit a fixed source and a pair of galvanometric mirrors arranged in series one after the other are used to direct the light beam.

Each mirror is motorised so that it can rotate around a respective rotation axis orthogonal to the axis of the other mirror, so that the combination of their rotations makes it possible to direct the beam towards any point of the reference surface.

Compared to the known system previously described, the one just described above offers the advantages that it allows the beam to be moved very rapidly, due to the lower inertia of the galvanometric mirrors, and that it is more reliable, due to the smaller number of mechanical components used.

Notwithstanding said advantages, the cost of galvanometric mirrors is relatively high, which considerably affects the cost of the stereolithography machine.

An optical unit based on galvanometric mirrors poses the further drawback of being relatively bulky.

The high cost and the considerable overall dimensions make the stereolithography machine unsuitable for any small series production, i.e. of the kind that may be required by small companies.

Furthermore, galvanometric mirrors include some mechanical components that are subject to wear and therefore limit their advantages compared to the mechanical moving devices mentioned above.

Furthermore, the inertia of galvanometric mirrors is not negligible and affects the speed of deviation of the light beam and therefore the overall processing time.

The present invention intends to overcome all the drawbacks mentioned above that are typical of the known art.

In particular, it is the object of the invention to provide a stereolithography machine that offers the same advantages offered by the stereolithography machines of the known type based on the use of galvanometric mirrors and that furthermore is simpler to produce and to use than the latter.

It is a further object of the invention to provide a stereolithography machine that has reduced overall dimensions and lower production costs compared to the machines of the known type with equivalent potential.

The achievement of said object advantageously makes the stereolithography machine of the invention convenient also for small series production, for which the stereolithography machines of the known type are not suitable.

Said objects are achieved by a stereolithography machine made according to the main claim.

Further details of the invention are illustrated in the corresponding dependent claims.

Said objects and advantages, together with others that are highlighted below, will be evident from the following descriptions of some preferred embodiments of the invention that are provided by way of non-limiting examples with reference to the attached drawings, wherein:

FIG. 2 shows a detail of the stereolithography machine shown in FIG. 1.

Figure 1:
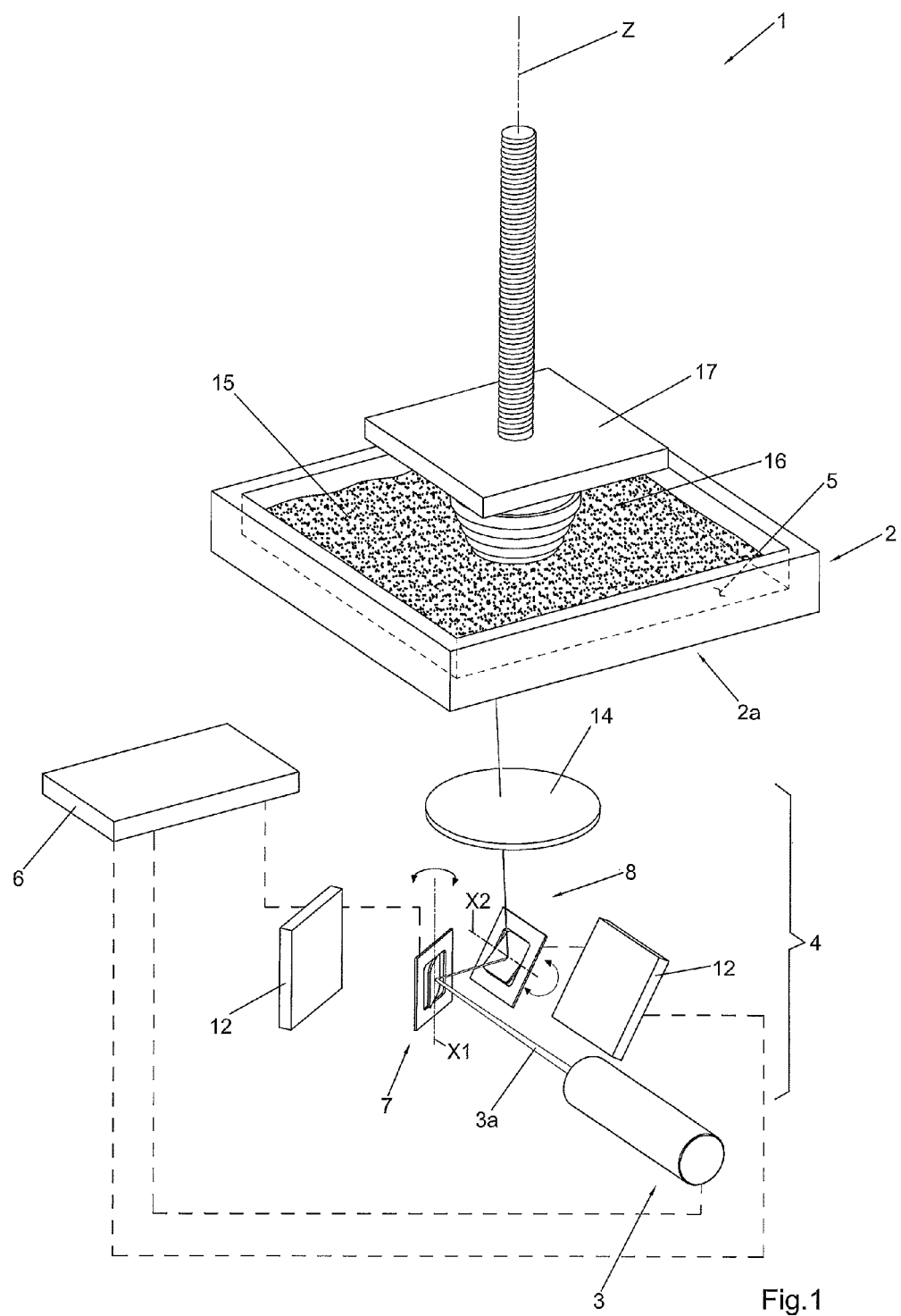
FIG. 1 shows a stereolithography machine according to the invention.

The stereolithography machine that is the subject of the invention, indicated as a whole by 1 in FIG. 1, makes it possible to produce a three-dimensional object 16 through a process according to which a plurality of layers are superimposed on one another, said layers being obtained through selective exposure of a fluid substance 15 to predefined radiation 3a suited to solidify it.

Preferably, said fluid substance 15 is a light-sensitive liquid resin and the predefined radiation 3a is a laser light emitting in the range of visible or ultraviolet frequencies.

Obviously, in variant embodiments of the invention the fluid substance 15 can be of any type, liquid or pasty, provided that it is suited to solidify when exposed to predefined radiation 3a.

Analogously, said source 3 of the radiation 3a can emit radiation 3a different from the one mentioned above, provided that it is capable of solidifying the fluid substance 15.

The stereolithography machine 1 comprises a container 2 for said fluid substance 15 and a modelling plate 17 suited to support the object 16 being formed and motorised so that it moves according to a vertical movement axis Z.

The machine 1 furthermore comprises a source 3 suited to emit the predefined radiation 3a and an optical unit 4 suited to direct the radiation 3a towards any point of a reference surface 5 arranged inside the container 2, at the level of the volume occupied by the fluid substance 15.

Preferably, said reference surface 5 is plane and is arranged so that it is adjacent to the bottom 2a of the container 2.

In this case, the optical unit 4 is configured in such a way as to direct the predefined radiation 3a from bottom to top, so that it is incident on the bottom 2a.

Furthermore, the bottom 2a is transparent to the radiation 3a so that the latter can hit the fluid substance 15 located in proximity to the bottom itself so as to solidify said fluid substance 15.

According to this embodiment of the invention, the three-dimensional object 16 is made under the modelling plate 17, as can be seen in FIG. 1.

According to a variant embodiment of the invention, not illustrated herein, the optical unit is configured in such a way as to direct the radiation 3a from top to bottom on the free surface of the fluid substance 15 present in the container 2.

In this case, the object is made over the modelling plate 17.

In both of said variant embodiments, the stereolithography machine 1 comprises a logic control unit 6 configured so as to control the optical unit 4 and/or the source 3 so as to expose the fluid substance 15 selectively to the radiation 3a at the level of a predefined portion of the reference surface 5.

In greater detail, said predefined portion corresponds to the portion of volume that from time to time corresponds to each layer of the three-dimensional object 16.

According to the invention, the optical unit 4 comprises two micro-opto-electro-mechanical systems 7 and 8 that in the field of integrated circuit technology are known with the acronym "MOEMS".

As is known, MOEMS devices are made using the same technology used in microelectronics for the production of integrated circuits, for example through solid deposition, photolithography, engraving etc.

Each one of said micro-opto-electro-mechanical systems 7 and 8, a possible embodiment of which is schematically represented in FIG. 2 by way of example without limitation, comprises a micro mirror 9 associated with a supporting structure 10 through articulation means 11 configured so as to define for each micro-opto-electro-mechanical system 7 and 8 a rotation axis X1 and X2 of the mirror 9 with respect to the structure 10.

As can be observed in FIG. 1, said two micro-opto-electro-mechanical systems 7 and 8 are arranged in series one after the other, so that the radiation 3a originating from the source 3 is incident in sequence on the mirror 9 of the first micro-opto-electro-mechanical system 7 and on the mirror 9 of the second micro-opto-electro-mechanical system 8.

According to the invention, the two micro-opto-electro-mechanical systems 7 and 8 are arranged with respect to the radiation source 3 and to the container 2 in such a way that the radiation 3a, originating from the second one of said micro-opto-electro-mechanical systems 8, can be directed towards each point of said reference surface 5 through a corresponding combination of the rotations of both the mirrors 9 around the respective axes X1 and X2.

In particular, the two micro-opto-electro-mechanical systems 7 and 8 are arranged between the source 3 and the reference source 5, in such a way that the two rotation axes X1 and X2 are preferably orthogonal to each other.

Each one of said two micro-opto-electro-mechanical systems 7 or 8 furthermore comprises actuator means 12, of the type known per se, suited to move the mirror 9 around its own axis X1 or X2 in an independent manner with respect to the movement of the mirror 9 of the other micro-opto-electro-mechanical system 7 or 8.

Said actuator means 12 can be of the electrostatic, magnetic, thermal-mechanical type or of any other known type that can be obtained by means of said MOEMS technology.

Advantageously, the micro-opto-electro-mechanical systems 7 and 8 are less expensive than the systems based on galvanometric mirrors, which reduces even more the cost of the stereolithography machine 1. Furthermore, advantageously, the micro-opto-electro-mechanical systems 7 and 8 have lower inertia than the galvanometric mirrors, which makes it possible to obtain higher angular speeds and thus to reduce the time necessary for making the three-dimensional object 16 compared to the stereolithography machines of the known type, assuming that the geometry of the object is the same.

Still advantageously, the micro-opto-electro-mechanical systems 7 and 8 have much smaller overall dimensions than the optical units with galvanometric mirrors having equivalent potential, which makes it possible to reduce the overall dimensions of the stereolithography machine 1.

Consequently, the invention makes it possible to produce a stereolithography machine 1 that, owing to its reduced cost and its limited overall dimensions, is suited to be used even in applications for which the stereolithography machines of the known type are not suitable.

A further advantage offered by the micro-opto-electro-mechanical systems 7 and 8 is represented by the fact that they absorb much less energy than the systems with galvanometric mirrors of the known type having equivalent potential.

The reduced energy consumption, together with the considerable compactness, allows the stereolithography machine 1 to be battery-powered, thus making it portable.

It can furthermore be understood that the stereolithography machine 1 described above offers all the advantages that are typical of the systems employing optical units with galvanometric mirrors, in particular their precision and the possibility to modulate the power of the radiation 3a in the different areas of the object 16.

Preferably, the mirror 9 and the supporting structure 10 of each one of the micro-opto-electro-mechanical systems 7 and 8 are obtained in a single piece and are connected to each other through corresponding connection areas 13 belonging to the articulation means 11 and thin enough to yield elastically according to the rotation axis X1 or X2, in such a way as to allow the rotation of the mirror 9 with respect to the supporting structure 10.

In particular, each one of said connection areas 13 works as a torsion spring that can be deformed to a degree that depends on a pilot voltage of the device.

Obviously, in variant embodiments of the invention the micro-opto-electro-mechanical systems 7 and 8 can be made in any shape, provided that for each one of them the corresponding mirror 9 can rotate around an axis with respect to the supporting structure 10.

As regards the actuator means 12 that set the mirror 9 of each one of said micro-opto-electro-mechanical systems 7 and 8 moving, they are preferably configured so that they rotate said mirror 9 around the axis X1 or X2 based on the value of a control signal sent by the logic control unit 6 and representing the angular position that the mirror 9 has to assume.

In particular, the logic control unit 6 is configured in such a way as to move both the mirrors 9 of the two micro-opto-electro-mechanical systems 7 and 8 in such a way that the radiation 3a falls inside the predefined portion corresponding to the layer of the object 16 to be made, following one or more continuous trajectories.

Preferably but not necessarily, said movement takes place according to a single continuous trajectory that entirely covers the predefined portion.

According to a variant embodiment of the invention, the micro-opto-electro-mechanical systems 7 and 8 and the corresponding actuator means 12 are configured so as to generate a cyclic movement of the mirrors 9, said movement being such that the radiation 3a can progressively stimulate the entire reference surface 5 on each cycle.

For example, said cyclic movement may comprise an oscillation of a mirror 9 of one of the two micro-opto-electro-mechanical systems 7 or 8 according to its rotation axis X1 or X2 alternatively in the two directions of rotation, said oscillation being preferably obtained by exploiting the resonance frequency of the corresponding connection areas 13, which is combined with a rotation of the mirror 9 of the other micro-opto-electro-mechanical system 7 or 8 according to a single direction of rotation on its axis X1 or X2.

In this way, the radiation 3a is incident on the reference surface 5 describing a zigzag trajectory that, at each segment, crosses the reference surface 5 in one of its dimensions and, at the same time, moves according to the other dimension.

In the latter embodiment, the logic control unit 6 is configured so as to modify the intensity of the source 3 during said cyclic movement of the mirrors 9.

In particular, when the point of incidence is inside the predefined portion of the reference surface 5 the intensity of the source 3 is increased in such a way as to solidify the fluid substance 15 in that point, while when the point of incidence is external to the predefined portion the intensity is decreased in such a way as to avoid solidifying the corresponding portion of fluid substance 15.

Each one of the micro-opto-electro-mechanical systems 7 and 8 described above preferably belongs to an integrated circuit provided with pins for electric connection to the machine 1, which is provided with a corresponding connector, or a socket, configured in such a way as to house said pins and also suited to allow the integrated circuit to be mechanically fixed to the machine 1.

Preferably, said connectors or sockets are of the type with low insertion force.

In variant embodiments of the invention, the micro-opto-electro-mechanical systems 7 and 8 can be directly welded onto the supporting electronic circuit, avoiding the use of the connector or the socket.

According to a variant embodiment, which is not represented in the drawings, both micro-opto-electro-mechanical systems 7 and 8 are arranged inside a single hermetically-sealed container comprising a transparent window arranged in such a way as to allow the predefined radiation 3a reflected by the micro-opto-electro-mechanical systems 7 and 8 to exit outside the container.

Advantageously, the above hermetically-sealed container results in considerable increase in lifetime of the optical unit 4.

In fact, the applicant of the present invention observed that the predefined radiation 3a causes the ambient dust to deposit on the surfaces where the radiation is incident. This effect is particularly noticeable when the predefined radiation 3a is a laser beam having frequencies in the typical range used in stereolithography.

The above effect is particularly prejudicial to the very small surfaces of the micro-opto-electro-mechanical systems 7 and 8, which are rapidly covered by the dust, hence causing worsening of their reflective effect. Since, due to the extreme fragility of the micro-opto-electro-mechanical systems 7 and 8, it is not possible cleaning them, the above effect must be compensated through increasing the power of the predefined radiation 3a, which nevertheless causes increased heating of the micro-opto-electro-mechanical systems 7 and 8, thus speeding up their deterioration.

The hermetically-sealed container prevents the above effect. In particular, the transparent window can be cleaned more easily, preventing the above drawbacks.

Also advantageously, the hermetically-sealed container allows to incorporate the two micro-opto-electro-mechanical systems 7 and 8 in a single integrated circuit, preferably having a common support structure 10.

As regards the optical unit 4, this preferably comprises one or more lenses 14 configured so as to focus the radiation 3a on the reference surface 5.

Preferably, said lens 14 is of the so-called "flat field" type, which is such as to focus the radiation 3a on a plane reference surface 5.

In practice, the micro-opto-electro-mechanical systems 7 and 8 are arranged in the stereolithography machine 1 in such a way that the mirrors 9 are aligned with each other and with the radiation 3*a* produced by the source 3.

Preferably, the positions of the source 3 and of the two micro-opto-electro-mechanical systems 7 and 8 are such that when the mirrors 9 are in conditions of absence of rotation, that is, when the connection areas 13 of both the micro-opto-electro-mechanical systems 7 and 8 are not subjected to torsion, the radiation 3*a* is reflected towards the centre point of the reference surface 5.

Concerning the production of the actual three-dimensional object 16, this takes place according to a procedure that is completely analogous to that used for the optical units with galvanometric mirrors and known per se.

According to the above, it can be understood that the stereolithography machine of the invention allows all the set objects to be achieved.

In particular, the invention achieves the object to provide a stereolithography machine that has reduced overall dimensions and lower production costs compared to the machines of the known type with equivalent potential.

Furthermore, micro-opto-electro-mechanical systems are more economical, less cumbersome and less energy-consuming than galvanometric systems, thus allowing the production of stereolithography machines suited for small series production, even portable.

Further variant embodiments of the invention, although not described herein and not illustrated in the drawings, must all be considered protected by the present patent, provided that they fall within the scope of the claims expressed below.

The invention claimed is:

1. A stereolithography machine comprising:
   a container for a fluid substance suited to be solidified through exposure to predefined radiation;
   a source of said predefined radiation;
   an optical unit suited to selectively direct said radiation towards any point of a reference surface arranged inside said container; and
   a logic control unit configured for controlling said optical unit and/or said radiation source in such a way as to scan and solidify a predefined portion of a volume of the fluid substance adjacent to said reference surface,
   wherein said optical unit comprises two micro-opto-electro-mechanical systems (MOEMS) arranged in series one after the other and each of which is provided with:
   a respective mirror associated with a supporting structure through an articulator configured so as to define for said mirror a respective independent rotation axis; and
   a respective actuator suited to move said respective mirror around said respective axis,
   said two micro-opto-electro-mechanical systems (MOEMS) being arranged with respect to said radiation source and to said container in such a way that said radiation, incident on said respective mirrors in sequence, can be directed at each point of said reference surface through a corresponding combination of rotations of each said respective mirror around said respective axis of said respective mirror.

2. The stereolithography machine according to claim 1, wherein said two rotation axes of said two micro-opto-electro-mechanical systems (MOEMS) are mutually orthogonal and wherein the actuator is operable to rotate each respective mirror independently.

3. The stereolithography machine according to claim 1, wherein said articulator of each one of said micro-opto-electro-mechanical system (MOEMS) comprises first connection areas, arranged between said respective mirror and said supporting structure, elastically yielding around said rotation axis.

4. The stereolithography machine according to claim 1, wherein said actuator of each one of said micro-opto-electro-mechanical system (MOEMS) is configured so as to rotate said mirror around said axis in such a way as to arrange it in an angular position in response to the reception of a control signal emitted by said logic control unit and having a value that is representative of said angular position.

5. The stereolithography machine according to claim 4, wherein said logic control unit is configured so as to move said mirror of both said micro-opto-electro-mechanical systems (MOEMS) so that the point of incidence of said radiation on said reference surface defines a continuous trajectory that completely covers said predefined portion.

6. The stereolithography machine according to claim 1, wherein said actuator of both said micro-opto-electro-mechanical systems is (MOEMS) configured so as to generate a cyclic movement of said mirrors such that said radiation can hit the entire reference surface on each cycle, said logic control unit being configured so as to selectively modify the intensity of said radiation source in such a way that, when said radiation falls inside said predefined portion, said intensity is higher than when said radiation falls outside said predefined portion.

7. The stereolithography machine according to claim 1, wherein each one of said micro-opto-electro-mechanical systems (MOEMS) belongs to an integrated circuit provided with pins for electrical connection, said machine comprising corresponding connectors configured for housing said pins in such a way as to mechanically fix said integrated circuit.

8. The stereolithography machine according to claim 1, wherein said radiation source is a laser emitter.

9. The stereolithography machine according to claim 1, wherein said optical unit comprises at least one lens configured as a flat field type so as to focus said radiation on said reference surface.

10. The stereolithography machine according to claim 1, wherein said optical unit comprises a hermetically-sealed container in which both said micro-opto-electro-mechanical systems (MOEMS) are arranged, said hermetically-sealed container being provided with a window through which the predefined radiation reflected by said micro-opto-electro-mechanical systems (MOEMS) can exit said hermetically-sealed container.

11. The stereolithography machine according to claim 1, wherein said micro-opto-electro-mechanical systems (MOEMS) belongs to a common integrated circuit.

12. The stereolithography machine according to claim 1 wherein the logic control unit is configured to selectively modify intensity of the radiation source during the scanning such that the intensity of the radiation source is selectively increased in such a manner as to solidify the fluid substance and the intensity is selectively decreased in such a manner as to avoid solidifying the fluid substance.

13. The stereolithography machine according to claim 1 wherein each actuator is at least one of an electrostatic type and a thermo-mechanical type.

14. The stereolithography machine of claim 1 wherein the reference surface is adjacent to a transparent bottom of the container and the radiation is directed so that it passes through the bottom to scan the fluid substance in proximity to the bottom.

* * * * *